United States Patent
Thompson

(10) Patent No.: US 9,407,510 B2
(45) Date of Patent: Aug. 2, 2016

(54) PHYSICAL LAYER SYSTEM WITH SUPPORT FOR MULTIPLE ACTIVE WORK ORDERS AND/OR MULTIPLE ACTIVE TECHNICIANS

(71) Applicant: CommScope Technologies LLC, Hickory, NC (US)

(72) Inventor: Pat Thompson, Prior Lake, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/477,231

(22) Filed: Sep. 4, 2014

(65) Prior Publication Data

US 2015/0061883 A1 Mar. 5, 2015

Related U.S. Application Data

(60) Provisional application No. 61/873,610, filed on Sep. 4, 2013.

(51) Int. Cl.
*G08B 5/00* (2006.01)
*H04L 12/24* (2006.01)

(52) U.S. Cl.
CPC ............ *H04L 41/22* (2013.01); *H04L 41/0879* (2013.01); *H04L 41/0883* (2013.01)

(58) Field of Classification Search
CPC .... G02B 6/3895; H04Q 1/138; H01R 13/641; H04L 41/22; H04L 41/0879; H04L 41/0883
USPC ............................... 340/815.4, 815.45, 691.4
See application file for complete search history.

(56) References Cited

U.S. PATENT DOCUMENTS

| | | | |
|---|---|---|---|
| 5,052,940 A | 10/1991 | Bengal |
| 5,161,988 A | 11/1992 | Krupka |
| 5,195,902 A | 3/1993 | Bengal |
| 5,299,944 A | 4/1994 | Larabell et al. |
| 5,394,503 A | 2/1995 | Dietz, Jr. et al. |
| 5,418,334 A | 5/1995 | Williams |
| 5,420,512 A | 5/1995 | Spillane et al. |

(Continued)

FOREIGN PATENT DOCUMENTS

| CN | 1809985 | 7/2006 |
|---|---|---|
| EP | 1569494 | 8/2005 |

(Continued)

OTHER PUBLICATIONS

International Searching Authority, "International Search Report from PCT Application PCT/US2014/054042 mailed Dec. 18, 2014", "from Foreign Counterpart of U.S. Appl. No. 14/477,231", Dec. 18, 2014, pp. 1-12, Published in: WO.

(Continued)

*Primary Examiner* — Thomas Mullen
(74) *Attorney, Agent, or Firm* — Fogg & Powers LLC

(57) ABSTRACT

Multiple visual indications are provided at a device in connection with multiple work orders. Each work order involves a respective connection using the device. The multiple visual indications are provided simultaneously for at least a part of the time the visual indications are provided. In one implementation, the visual indications differ from one another. What each visual indication looks like is displayed on a respective portable device configured to display information about the work order associated with that visual indication.

26 Claims, 2 Drawing Sheets

(56) References Cited

U.S. PATENT DOCUMENTS

| | | |
|---|---|---|
| 5,448,675 A | 9/1995 | Leone et al. |
| 5,461,693 A | 10/1995 | Pimpinella |
| 5,463,706 A | 10/1995 | Dumont et al. |
| 5,473,715 A | 12/1995 | Schofield et al. |
| 5,483,467 A | 1/1996 | Krupka |
| 5,487,666 A | 1/1996 | DiGiovanni |
| 5,541,586 A | 7/1996 | Wise |
| 5,550,755 A | 8/1996 | Martin et al. |
| 5,606,664 A | 2/1997 | Brown et al. |
| 5,649,001 A | 7/1997 | Thomas et al. |
| 5,764,043 A | 6/1998 | Czosnowski et al. |
| 5,821,510 A | 10/1998 | Cohen et al. |
| 5,832,071 A | 11/1998 | Voelker |
| 5,854,824 A | 12/1998 | Bengal et al. |
| 5,876,240 A | 3/1999 | Derstine et al. |
| 5,909,464 A | 6/1999 | Cohen et al. |
| 5,910,776 A | 6/1999 | Black |
| 6,002,331 A | 12/1999 | Laor |
| 6,222,908 B1 | 4/2001 | Bartolutti et al. |
| 6,223,219 B1 | 4/2001 | Uniacke et al. |
| 6,234,830 B1 | 5/2001 | Ensz et al. |
| 6,238,235 B1 | 5/2001 | Shavit et al. |
| 6,240,090 B1 | 5/2001 | Enhager |
| 6,285,293 B1 | 9/2001 | German et al. |
| 6,300,877 B1 | 10/2001 | Schannach et al. |
| 6,307,880 B1 | 10/2001 | Evans et al. |
| 6,330,148 B1 | 12/2001 | Won et al. |
| 6,330,307 B1 | 12/2001 | Bloch et al. |
| 6,350,148 B1 | 2/2002 | Bartolutti et al. |
| 6,359,859 B1 | 3/2002 | Brolin et al. |
| 6,368,155 B1 | 4/2002 | Bassler et al. |
| 6,378,111 B1 | 4/2002 | Brenner et al. |
| 6,424,710 B1 | 7/2002 | Bartolutti et al. |
| 6,442,032 B1 | 8/2002 | Linares et al. |
| 6,499,861 B1 | 12/2002 | German et al. |
| 6,516,345 B1 | 2/2003 | Kracht |
| 6,522,737 B1 | 2/2003 | Bartolutti et al. |
| 6,564,258 B1 | 5/2003 | Uniacke |
| 6,574,221 B1 | 6/2003 | Petersen |
| 6,574,586 B1 | 6/2003 | David et al. |
| 6,577,243 B1 | 6/2003 | Dannenmann et al. |
| 6,636,152 B2 | 10/2003 | Schannach et al. |
| 6,684,179 B1 | 1/2004 | David |
| 6,725,177 B2 | 4/2004 | David et al. |
| 6,778,505 B1 | 8/2004 | Bullman et al. |
| 6,784,802 B1 | 8/2004 | Stanescu |
| 6,808,116 B1 | 10/2004 | Eslambolchi et al. |
| 6,847,856 B1 | 1/2005 | Bohannon |
| 6,881,096 B2 | 4/2005 | Brown et al. |
| D510,068 S | 9/2005 | Haggay et al. |
| 6,961,675 B2 | 11/2005 | David |
| 6,968,994 B1 | 11/2005 | Ashwood Smith |
| 6,976,867 B2 | 12/2005 | Navarro et al. |
| 6,993,417 B2 | 1/2006 | Osann, Jr. |
| 7,038,135 B1 | 5/2006 | Chan et al. |
| 7,039,028 B2 | 5/2006 | Chen et al. |
| 7,042,562 B2 | 5/2006 | Kiani et al. |
| 7,046,899 B2 | 5/2006 | Colombo et al. |
| 7,057,105 B2 | 6/2006 | Gottardo et al. |
| 7,075,910 B2 | 7/2006 | Chen et al. |
| 7,077,710 B2 | 7/2006 | Haggay et al. |
| 7,081,808 B2 | 7/2006 | Colombo et al. |
| 7,123,810 B2 | 10/2006 | Parrish |
| 7,126,918 B2 | 10/2006 | Roberts |
| 7,136,936 B2 | 11/2006 | Chan et al. |
| 7,142,536 B1 | 11/2006 | Gossett et al. |
| 7,153,142 B2 | 12/2006 | Shifris et al. |
| 7,159,026 B2 | 1/2007 | Lau et al. |
| 7,160,143 B2 | 1/2007 | David et al. |
| 7,193,422 B2 | 3/2007 | Velleca et al. |
| 7,197,214 B2 | 3/2007 | Elkins, II et al. |
| 7,226,217 B1 | 6/2007 | Benton et al. |
| 7,229,020 B2 | 6/2007 | Goodison et al. |
| 7,234,944 B2 | 6/2007 | Nordin et al. |
| 7,246,746 B2 | 7/2007 | McNamara et al. |
| 7,254,652 B2 | 8/2007 | Anderson et al. |
| 7,266,087 B2 | 9/2007 | Wahl |
| 7,289,334 B2 | 10/2007 | Behrens et al. |
| 7,289,436 B2 | 10/2007 | Schaller et al. |
| 7,297,018 B2 | 11/2007 | Caveney et al. |
| 7,312,715 B2 | 12/2007 | Shalts et al. |
| D559,186 S | 1/2008 | Kelmer |
| 7,315,224 B2 | 1/2008 | Gurovich et al. |
| 7,317,735 B1 | 1/2008 | Ojard |
| 7,328,033 B2 | 2/2008 | Rappaport et al. |
| D564,966 S | 3/2008 | Shifris |
| 7,352,289 B1 | 4/2008 | Harris |
| 7,377,819 B1 | 5/2008 | Cooper et al. |
| 7,382,765 B2 | 6/2008 | Kennedy et al. |
| 7,401,985 B2 | 7/2008 | Aronson et al. |
| 7,406,231 B1 | 7/2008 | Beck et al. |
| D575,743 S | 8/2008 | Shifris et al. |
| 7,411,405 B2 | 8/2008 | Nordin |
| 7,433,363 B2 | 10/2008 | Rosen et al. |
| 7,445,389 B2 | 11/2008 | Aronson |
| 7,453,864 B2 | 11/2008 | Kennedy et al. |
| 7,468,669 B1 | 12/2008 | Beck et al. |
| 7,479,032 B2 | 1/2009 | Hoath et al. |
| 7,483,419 B2 | 1/2009 | Bullman et al. |
| 7,499,616 B2 | 3/2009 | Aronson et al. |
| 7,517,243 B2 | 4/2009 | Caveney et al. |
| 7,540,667 B2 | 6/2009 | Murano |
| 7,547,150 B2 | 6/2009 | Downie et al. |
| 7,551,456 B2 | 6/2009 | Behrens et al. |
| 7,564,795 B2 | 7/2009 | Stephenson et al. |
| 7,586,942 B2 | 9/2009 | Golasky et al. |
| 7,605,707 B2 | 10/2009 | German et al. |
| 7,616,589 B2 | 11/2009 | Nagata et al. |
| 7,617,245 B2 | 11/2009 | De Souza et al. |
| 7,667,574 B2 | 2/2010 | Downie et al. |
| 7,698,156 B2 | 4/2010 | Martucci et al. |
| 7,760,094 B1 | 7/2010 | Kozischek et al. |
| 7,772,975 B2 | 8/2010 | Downie et al. |
| 7,782,202 B2 | 8/2010 | Downie et al. |
| 7,839,266 B2 | 11/2010 | Hoglund et al. |
| 7,855,697 B2 | 12/2010 | Chamarti et al. |
| 7,856,166 B2 | 12/2010 | Biribuze et al. |
| 7,870,242 B2 | 1/2011 | Nguyen |
| 7,965,186 B2 | 6/2011 | Downie et al. |
| 8,000,991 B2 | 8/2011 | Montagut |
| 8,037,173 B2 | 10/2011 | Tuckey et al. |
| 8,050,939 B2 | 11/2011 | Graves et al. |
| 8,075,348 B2 | 12/2011 | Mei et al. |
| 8,092,249 B2 | 1/2012 | German et al. |
| 8,099,311 B2 | 1/2012 | La Vecchia et al. |
| 8,116,434 B2 | 2/2012 | German et al. |
| 8,138,925 B2 | 3/2012 | Downie et al. |
| 8,172,468 B2 | 5/2012 | Jones et al. |
| 8,181,229 B2 | 5/2012 | Macauley |
| 8,203,450 B2 | 6/2012 | German et al. |
| 8,248,208 B2 | 8/2012 | Renfro, Jr. |
| 8,264,355 B2 | 9/2012 | Kozischek et al. |
| 8,264,366 B2 | 9/2012 | Chamarti et al. |
| 2001/0001270 A1 | 5/2001 | Williams Vigliaturo |
| 2001/0024360 A1 | 9/2001 | Hirata et al. |
| 2002/0138604 A1 | 9/2002 | Kopelovitz et al. |
| 2003/0046339 A1 | 3/2003 | Ip |
| 2003/0061393 A1 | 3/2003 | Steegmans et al. |
| 2003/0194912 A1 | 10/2003 | Ferentz |
| 2003/0197619 A1 | 10/2003 | Lawrence et al. |
| 2003/0219033 A1 | 11/2003 | Silvester |
| 2004/0024717 A1 | 2/2004 | Sneeringer |
| 2004/0073597 A1 | 4/2004 | Caveney et al. |
| 2005/0071514 A1 | 3/2005 | Anderson et al. |
| 2005/0164548 A1 | 7/2005 | Spears et al. |
| 2005/0186819 A1 | 8/2005 | Velleca et al. |
| 2005/0190768 A1 | 9/2005 | Cutler |
| 2005/0245127 A1 | 11/2005 | Nordin et al. |
| 2006/0047800 A1 | 3/2006 | Caveney et al. |
| 2006/0059293 A1 | 3/2006 | Wurzburg et al. |
| 2006/0160395 A1 | 7/2006 | Macauley et al. |
| 2006/0160396 A1 | 7/2006 | Macauley et al. |
| 2006/0179144 A1 | 8/2006 | Nagase |
| 2006/0185887 A1 | 8/2006 | Neujahr |

(56) References Cited

U.S. PATENT DOCUMENTS

| | | | |
|---|---|---|---|
| 2006/0203715 A1 | 9/2006 | Hunter et al. | |
| 2006/0227759 A1 | 10/2006 | Bohm et al. | |
| 2006/0235741 A1 | 10/2006 | Deaton et al. | |
| 2006/0253561 A1 | 11/2006 | Holmeide et al. | |
| 2006/0268507 A1 | 11/2006 | Takahashi | |
| 2006/0268747 A1 | 11/2006 | Van Haalen et al. | |
| 2006/0282527 A1 | 12/2006 | Chiou et al. | |
| 2007/0025306 A1 | 2/2007 | Cox et al. | |
| 2007/0058338 A1 | 3/2007 | Lee | |
| 2007/0117444 A1 | 5/2007 | Caveney et al. | |
| 2007/0132503 A1* | 6/2007 | Nordin | H04Q 1/136 327/518 |
| 2007/0153823 A1 | 7/2007 | Wojtowicz | |
| 2007/0162954 A1 | 7/2007 | Pela | |
| 2007/0230452 A1 | 10/2007 | Hough et al. | |
| 2007/0274234 A1 | 11/2007 | Kubota | |
| 2008/0049627 A1 | 2/2008 | Nordin | |
| 2008/0159738 A1 | 7/2008 | Lavranchuk | |
| 2008/0181136 A1 | 7/2008 | Watanabe et al. | |
| 2008/0181138 A1 | 7/2008 | Dalberg | |
| 2008/0219268 A1 | 9/2008 | Dennison | |
| 2008/0265915 A1 | 10/2008 | Clark et al. | |
| 2009/0081888 A1 | 3/2009 | Nordin et al. | |
| 2009/0100298 A1 | 4/2009 | Lange et al. | |
| 2009/0195349 A1 | 8/2009 | Frader-Thompson et al. | |
| 2009/0322487 A1 | 12/2009 | Lange et al. | |
| 2010/0015847 A1* | 1/2010 | Jacks | H01R 13/641 439/490 |
| 2010/0020722 A1 | 1/2010 | Farkas et al. | |
| 2010/0054157 A1 | 3/2010 | Farkas et al. | |
| 2010/0120264 A1* | 5/2010 | Caveney | H01R 3/00 439/49 |
| 2010/0210135 A1 | 8/2010 | German et al. | |
| 2010/0211664 A1 | 8/2010 | Raza et al. | |
| 2010/0211665 A1 | 8/2010 | Raza et al. | |
| 2010/0211697 A1 | 8/2010 | Raza et al. | |
| 2010/0215049 A1 | 8/2010 | Raza et al. | |
| 2010/0238003 A1 | 9/2010 | Chan et al. | |
| 2010/0267274 A1 | 10/2010 | McNally et al. | |
| 2010/0271961 A1 | 10/2010 | Caveney | |
| 2011/0043371 A1* | 2/2011 | German | H04Q 1/136 340/815.45 |
| 2011/0244698 A1 | 10/2011 | Jacks et al. | |
| 2011/0255611 A1 | 10/2011 | Caveney et al. | |
| 2012/0007717 A1 | 1/2012 | Jong | |
| 2012/0084108 A1 | 4/2012 | Bohannon et al. | |
| 2012/0309211 A1 | 12/2012 | Jacks et al. | |
| 2013/0024563 A1 | 1/2013 | Torigoe et al. | |
| 2013/0128758 A1 | 5/2013 | Polland | |
| 2013/0205579 A1 | 8/2013 | Mather et al. | |
| 2013/0207782 A1 | 8/2013 | Mather et al. | |
| 2013/0234725 A1* | 9/2013 | Enge | H04Q 1/136 324/538 |
| 2013/0306723 A1 | 11/2013 | Mather et al. | |
| 2014/0016901 A1* | 1/2014 | Lambourn | G02B 6/3895 385/75 |
| 2014/0089028 A1 | 3/2014 | Marshall et al. | |

FOREIGN PATENT DOCUMENTS

| | | |
|---|---|---|
| JP | 2001297044 | 10/2001 |
| KR | 102008017170 | 2/2008 |
| KR | 1020100018708 | 2/2010 |
| KR | 101216682 | 1/2013 |
| WO | 2004105317 | 12/2004 |
| WO | 2011057383 | 5/2011 |

OTHER PUBLICATIONS

Chinese Patent Office, First Office Action, from Foreign Counterpart of U.S. Appl. No. 12/705,497, Nov. 2, 2012, pp. 1-34, Published in: CN.

Chinese Patent Office, Office Action, from Foreign Counterpart of U.S. Appl. No. 12/705,497, Apr. 24, 2013, pp. 1-10, Published in: CN.

European Patent Office, Extended European Search Report, from Foreign Counterpart of U.S. Appl. No. 12/705,497, Sep. 27, 2012, pp. 1-6, Published in: EP.

Mexican Patent Office, Office Action from MX Application No. MX/a/2011/005813 mailed Oct. 11, 2013, from Foreign Counterpart of U.S. Appl. No. 12/705,497, Oct. 11, 2013, pp. 1-8, Published in: MX.

U.S. Patent and Trademark Office, Final Office Action, U.S. Appl. No. 12/705,497, Oct. 16, 2012, pp. 1-29.

U.S. Patent and Trademark Office, Office Action, U.S. Appl. No. 12/705,497, Apr. 17, 2012, pp. 1-31.

The International Bureau of WIPO, International Preliminary Report on Patentability, from PCT Application No. PCT/US2010/024181, Aug. 25, 2011, pp. 1-7, Published in: CH.

Korean Intellectual Property Office, International Search Report, from PCT Application No. PCT/US2010/024181, Sep. 28, 2010, pp. 1-10, Published in: KR.

Chinese Patent Office, First Office Action, from Foreign Counterpart of U.S. Appl. No. 12/705,501, Sep. 5, 2012, pp. 1-24, Published in: CN.

Chinese Patent Office, Office Action, from Foreign Counterpart of U.S. Appl. No. 12/705,501, Mar. 13, 2013, pp. 1-38, Published in: CN.

State Intellectual Property Office, P.R. China, Third Office Action, from Foreign Counterpart of U.S. Appl. No. 12/705,501, Jul. 31, 2013, pp. 1-7, Published in: CN.

European Patent Office, Extended European Search Report, from Foreign Counterpart of U.S. Appl. No. 12/705,501, Sep. 19, 2012, pp. 1-9, Published in: EP.

European Patent Office, Extended European Search Report, from Foreign Counterpart of U.S. Appl. No. 12/705,501, May 22, 2012, pp. 17, Published in: EP.

Mexican Patent Office, Office Action from MX Application No. MX/a/2011/008507 mailed Oct. 11, 2013, from Foreign Counterpart of U.S. Appl. No. 12/705,501, Oct. 11, 2013, pp. 1-11, Published in: MX.

U.S. Patent and Trademark Office, Office Action, U.S. Appl. No. 12/705,501, Apr. 5, 2013, pp. 1-39.

U.S. Patent and Trademark Office, Office Action, from U.S. Appl. No. 12/705,501, Sep. 24, 2013, pp. 1-18.

U.S. Patent and Trademark Office, Restriction Requirement, U.S. Appl. No. 12/705,501, Dec. 14, 2012, pp. 1-6.

The International Bureau of WIPO, International Preliminary Report on Patentability, from PCT Application No. PCT/US2010/024184, Aug. 25, 2011, pp. 1-7, Published in: CH.

Korean Intellectual Property Office, International Search Report, from PCT Application No. PCT/US2010/024184, Sep. 27, 2010, pp. 1-10, Published in: KR.

European Patent Office, Extended European Search Report, from Foreign Counterpart of U.S. Appl. No. 12/705,506, Oct. 11, 2012, pp. 1-9, Published in: EP.

Mexican Patent Office, Office Action from MX Application No. MX/a/2011/008517 mailed Oct. 11, 2013, from Foreign Counterpart of U.S. Appl. No. 12/705,506, Oct. 11, 2013, pp. 1-7, Published in: MX.

U.S. Patent and Trademark Office, Final Office Action, U.S. Appl. No. 12/705,506, Dec. 14, 2012, pp. 1-29.

U.S. Patent and Trademark Office, Office Action, U.S. Appl. No. 12/705,506, Jun. 28, 2012, pp. 1-32.

The International Bureau of WIPO, International Preliminary Report on Patentability, from PCTCounterpart of U.S. Appl. No. 12/705,506, Aug. 25, 2011, pp. 1-6, Published in: CH.

International Searching Authority, International Search Report, from Foreign Counterpart of U.S. Appl. No. 12/705,506, Sep. 30, 2010, pp. 1-9, Published in: WO.

Chinese Patent Office, First Office Action, from Foreign Counterpart of U.S. Appl. No. 12/705,514, Sep. 4, 2012, pp. 1-14, Published in: CN.

Chinese Patent Office, Office Action, from Foreign Counterpart of U.S. Appl. No. 12/705,514, Mar. 5, 2013, pp. 1-24, Published in: CN.

State Intellectual Property Office, P.R. China, Third Office Action, from Foreign Counterpart of U.S. Appl. No. 12/705,514, Jun. 24, 2013, pp. 1-18, Published in: CN.

(56) References Cited

OTHER PUBLICATIONS

European Patent Office, Extended European Search Report, from Foreign Counterpart of U.S. Appl. No. 12/705,514, Oct. 11, 2012, pp. 1-6, Published in: EP.

Mexican Patent Office, Office Action from MX Application No. MX/a/2011/008506 mailed Oct. 10, 2013, from Foreign Counterpart of U.S. Appl. No. 12/705,514, Oct. 10, 2013, pp. 1-5, Published in: MX.

U.S. Patent and Trademark Office, Advisory Action, U.S. Appl. No. 12/705,514, Nov. 14, 2012, pp. 1-4.

U.S. Patent and Trademark Office, Final Office Action, U.S. Appl. No. 12/705,514, Aug. 23, 2012, pp. 1-20.

U.S. Patent and Trademark Office, Office Action, U.S. Appl. No. 12/705,514, Mar. 15, 2012, pp. 1-25.

U.S. Patent and Trademark Office, Office Action, from U.S. Appl. No. 12/705,514, Sep. 25, 2013, pp. 1-45, Published in: US.

U.S. Patent and Trademark Office, Pre-Appeal Brief Decision, U.S. Appl. No. 12/705,514, Dec. 18, 2012, pp. 1-2.

The International Bureau of WIPO, International Preliminary Report on Patentability, from PCT Counterpart of U.S. Appl. No. 12/705,514, Aug. 25, 2011, pp. 1-6, Published in: CH.

Korean Intellectual Property Office, International Search Report, from PCT Application No. PCT/US2010/024188, Sep. 28, 2010, pp. 1-9, Published in: KR.

U.S. Patent and Trademark Office, Advisory Action, from U.S. Appl. No. 13/248,413, Sep. 30, 2013, pp. 1-3.

U.S. Patent and Trademark Office, Final Office Action, from U.S. Appl. No. 13/248,413, Jul. 18, 2013, pp. 1-15.

U.S. Patent and Trademark Office, Office Action, from U.S. Appl. No. 13/248,413, Dec. 24, 2012, pp. 1-12, Published in: US.

The International Bureau of WIPO, International Preliminary Report on Patentability from PCT Application No. PCT/US2012/066366 mailed Jun. 5, 2014, from PCT Counterpart of U.S. Appl. No., Jun. 5, 2014, pp. 1-8, Published in: WO.

International Searching Authority, International Search Report, from Foreign Counterpart of U.S. Appl. No., Feb. 20, 2013, pp. 1-11.

European Patent Office, International Search Report, from PCT Application Serial No. PCT/EP2013/000441, Aug. 21, 2013, pp. 1-15, Published in: WO.

European Patent Office, International Search Report and Written Opinion, from PCT Counterpart of U.S. Appl. No. 14/037,871, Dec. 19, 2013, pp. 1-10, Published in: EP.

Figueira et al., "10GE WAN PHY: Physical Medium Attachment (PMA)", "IEEE 802.3 Meeting, Albuquerque", Mar. 2000, pp. 1-42.

Dimitrov et al., "Embedded Internet Based System", 2008, pp. 103-107.

, "Embedded Ethernet System Design Guide", Aug. 2008, Publisher: Silicon Laboratories.

, "The Ethersmart Wildcard", "http://www.mosaic-industries.com/Products/WildCards/ETHx/", 2008, Publisher: Mosaic Industries, Inc.

Farkas et al., "Automatic Discovery of Physical Topology in Ethernet Networks", "Advance Information Networking and Applications, 2008. AINA 2008. 22nd International Conference on", Mar. 25-28, 2008, pp. 848-854, Publisher: IEEE, Published in: Okinawa.

Feuzeu et al., "A New Scheme for Interconnecting Lans With Label Switching Bridges", "Local Computer Networks, 2005. 30th Anniversary. The IEEE Conference on", Nov. 17, 2005, pp. 303-311, Publisher: IEEE, Published in: Sydney.

, "IntelliMAC", May 2003, pp. 1-6, Publisher: Nordx/CDT.

Kang et al., "Design and Implementation of Network Management System for Power Line Communication Network", "IEEE International Symposium on Power Line Communications and its Applications (ISPLC 2007)", Mar. 28, 2007, pp. 23-28, Publisher: IEEE.

, "ID Tag Requirements for Infrastructure and Network Elements Management", Dec. 2011, pp. 1-32, Publisher: International Telecommunication Union.

Meredith, "Managers Missing Point of Intelligent Patching", "http://searchdatacenter.techtarget.com/news/article/0,289142,sid80_gci1099991,00.html", Jun. 21, 2005, pp. 1-2, Publisher: SearchDataCenter.com.

Milligan, "Intelligent Patching Systems Carving Out A 'Large' Niche", "http://www.cablinginstall.com/index/display/article-display/207641/articles/cabling-installation-maintenance/volume-12/issue-7/contents/technology/int", Jul. 1, 2004, pp. 1-6, vol. 12, No. 7, Publisher: Cabling Installation & Maintenance.

Mirjalily et al., "Best Multiple Spanning Tree in Metro Ethernet Networks", "Computer and Electrical Engineering, 2009. ICEE'09. Second International Conference on", Dec. 28-30, 2009, pp. 117-121, vol. 2, Publisher: IEEE, Published in: Dubai.

Feltgen, "PCT Patent Application PCT/EP2009/009036: Method and Arrangement for Identifying at Least One Object", Dec. 16, 2009, pp. 1-25, Published in: WO.

, "UPnP Device Architecture 1.1", Oct. 15, 2008, pp. 1-272, Publisher: UPnP Forum.

* cited by examiner

PHYSICAL LAYER SYSTEM WITH SUPPORT FOR MULTIPLE ACTIVE WORK ORDERS AND/OR MULTIPLE ACTIVE TECHNICIANS

CROSS-REFERENCE TO RELATED APPLICATIONS

This application claims the benefit of U.S. Provisional Patent Application Ser. No. 61/873,610, filed on Sep. 4, 2013, which is hereby incorporated herein by reference.

BACKGROUND

One common use of a physical layer management (PLM) system is to guide a technician in moving, adding, or changing a connection made at a patch panel or other device where connections are made using cables. This is commonly done as a part of a larger "work order" that includes one or more steps.

In one common implementation, the patch panel includes a light emitting diode for each port of the patch panel and a controller that interacts with a remotely located management system. To guide a technician in performing a step of a work order that affects a particular port of the patch panel, the management system can illuminate (or otherwise actuate) the light emitting diode that is associated with that port in order to visually identify the port for the technician. This is done to assist the technician in locating the correct port. That is, the light emitting diode is used to provide a visual indication of the affected port.

Such systems are typically designed to be used to guide a single technician in performing a single work order at a time. That is, such systems are not designed to guide multiple technicians in performing multiple work orders.

SUMMARY

One embodiment is directed to a system comprising a device that includes a plurality of ports to which cables can be attached and a plurality of visual indicators, each of which is configured to provide multiple visual indications. The system further comprises a management system communicatively coupled to the device, wherein the management system is configured to control the visual indicators. The management system is configured to cause the device to provide multiple visual indications at the device, each of the multiple visual indications being provided in connection with a respective work order that involves a respective connection using the device. The system is configured to provide the multiple visual indications simultaneously for at least a part of the time each of the multiple visual indications is provided.

In one implementation, the system further comprises a first portable device configured to execute a first work order application that displays information about the first work order, and a second portable device configured to execute a second work order application that displays information about the second work order. The system is configured to provide the first and second visual indicators simultaneously for at least a part of the time the first visual indication is provided and for at least a part of the time the second visual indication is provided by doing the following: having the first visual indication differ from the second visual indication, in connection with displaying information about the first work order on the first portable device, displaying on the first portable device what the first visual indication looks like, and, in connection with displaying information about the second work order on the second portable device, displaying on the second portable device what the second visual indication looks like.

Another embodiment is directed to a method performed using a device comprising a plurality of ports to which cables can be attached and a plurality of visual indicators, each of which is configured to provide multiple visual indications. The method comprises providing a first visual indication at the device in connection with a first work order, wherein the first work order involves a first connection using the device, and providing a second visual indication at the device in connection with a second work order, wherein the second work order involves a second connection using the device. The first visual indication and the second visual indication are provided simultaneously for at least a part of the time the first visual indication is provided and for at least a part of the time the second visual indication is provided.

In one implementation, the first visual indication differs from the second visual indication. The method further comprises displaying what the first visual indication looks like on a first portable device configured to display information about the first work order, and displaying what the second visual indication looks like on a second portable device configured to display information about the second work order.

Another embodiment is directed to a device that comprises a plurality of ports to attach communication cables to the device and a plurality of visual indicators, each of the plurality of visual indicators configured to provide multiple visual indications. The device is configured to provide a first visual indication at the device in connection with a first work order. The first work order involves a first connection using the device. The device is configured to provide a second visual indication at the device in connection with a second work order. The second work order involves a second connection using the device. The first visual indication and the second visual indication are provided simultaneously for at least a part of the time the first visual indication is provided and for at least a part of the time the second visual indication is provided.

Another embodiment is directed to a program product tangibly stored on a non-transitory storage medium comprising instructions operable to cause at least one programmable processor to communicate with a device to cause the device to provide a first visual indication at the device in connection with a first work order. The device comprises a plurality of ports to which cables can be attached and a plurality of visual indicators, each of which is configured to provide multiple visual indications. The first work order involves a first connection using the device. The program product comprises instructions further operable to cause the programmable processor to communicate with the device to cause the device to provide a second visual indication at the device in connection with a second work order. The second work order involves a second connection using the device. The first visual indication and the second visual indication are provided simultaneously for at least a part of the time the first visual indication is provided and for at least a part of the time the second visual indication is provided.

DRAWINGS

DETAILED DESCRIPTION

Figure 1:
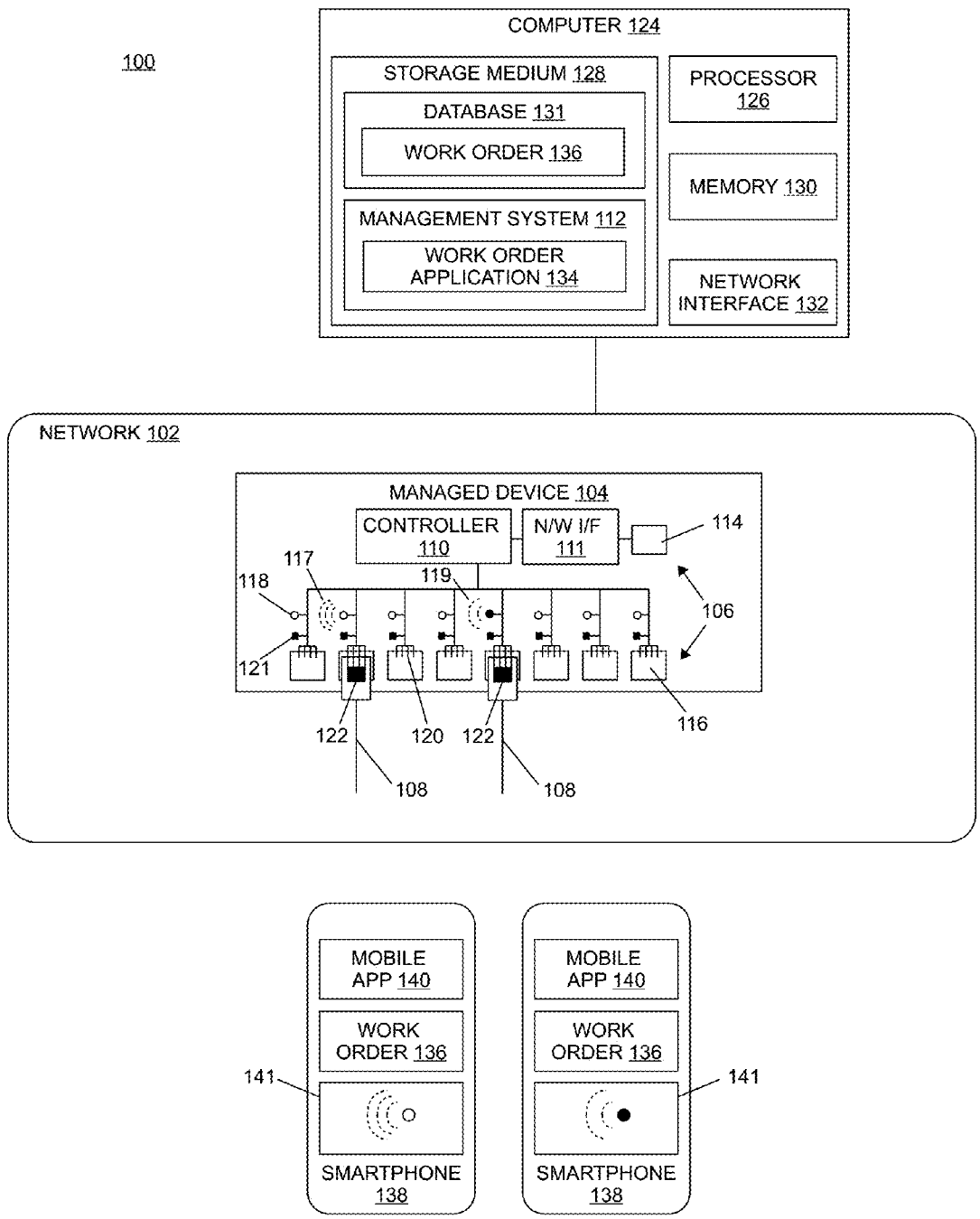
FIG. 1 is a block diagram of one exemplary embodiment of a physical layer management system.

FIG. 1 is a block diagram of one exemplary embodiment of system 100. The system 100 is also referred to here as a "physical layer management" (PLM) system 100.

In the exemplary embodiment shown in FIG. 1, the PLM system 100 is used to guide technicians in moving, adding, or changing connections made in a network 102. The PLM system 100 can also be used to track physical layer information related to the network 102. As used herein, "physical layer information" comprises information about the cabling, connections, and communication links that exist in the network 102.

In the exemplary embodiment shown in FIG. 1, the network 102 includes various network elements or devices to which cables are connected. In the exemplary embodiment shown in FIG. 1, the network 102 includes a managed network element or device 104 that includes a plurality of ports 106 to which cables 108 can be attached.

More specifically, in the exemplary embodiment shown in FIG. 1, the managed device 104 comprises a patch panel (and is also referred to here as "managed patch panel" 104). The managed patch panel 104 is described here, in this exemplary embodiment, as being designed for use with copper twisted-pair CAT-5, 6, and 7 cables typically used to implement ETHERNET local area networks. The managed device can be implemented in other ways (for example, as an optical distribution frame, splitter tray, switch, router, etc.). Also, the managed device 104 can be implemented for use with other types of cables (for example, other types of copper cables or fiber optic cables).

The managed device 104 includes a controller or other programmable processor 110 that is configured to communicate with a management system 112 over the network 102. The managed device 104 also includes a network interface 111 for communicatively coupling the managed device 104 (more specifically, the controller 110) to the network 102 and, ultimately, the management system 112. In the example shown in FIG. 1, the controller 110 and the network interface 111 are communicatively coupled to the network 102 and the management system 112 by including a respective "management" or "non-service" port 114 in the managed device 104. The management port 114 is separate from the "service" ports 116 of that device 104. However, the controller 110 in the managed device 104 can be communicatively coupled to the network 102 using one or more of the "service" ports 116.

The managed device 104 includes one or more visual indicators 118 that are associated with each service port 116 of the managed device 104. In this exemplary embodiment, each visual indicator 118 is implemented using a light emitting diode (LED). Each LED 118 is coupled to the controller 110 in the managed device 104 so that the controller 110 (more specifically, the software executing on the controller 110) can control the LED 118.

In this example, the managed device 104 is configured so that each LED 118 can provide multiple visual indications. These multiple visual indications can be provided by having each LED 118 display multiple colors, blink at multiple rates, and/or blink in multiple patterns. Multiple visual indications can be provided in other ways.

A visual indication is provided in order to assist a technician in locating the associated service port 116 of the managed device 104.

In this example, the managed device 104 also includes, for each of the service ports 116, a storage device interface 120 that is configured so that, when a cable 108 is attached to that port 116, information can be read from any storage device 122 attached to the cable 108 by the controller 110 and communicated to the management system 112, which stores and/or updates information in a database or other data store 131 maintained by the management system 112.

In one example, each storage device interface 120 comprises a contact-based storage device interface that is configured for use in reading information from an Electrically Erasable Programmable Read-Only Memory (EEPROM) attached to each cable. In another example, each storage device interface 120 comprises a radio frequency identifier (RFID) interface that is configured for use in reading information from an RFID tag attached to a cable 108. That is, in such an RFID example, contact-less interfaces are used for reading information from the storage devices 122 attached to the cables 108 and each storage device 122 is implemented using an RFID tag.

The managed device 104 can also include a plurality of presence sensors 121, each of which is configured for use in determining if a cable is attached to one of the service ports 116. Such presence sensors 121 can be used in connection with the storage device interface 120 described above (for example, to determine when a cable 108 has been connected to a service port 116 and/or to determine if a cable 108 that does not have a storage device 122 attached to it has been connected to a service port 116). Also, such presence sensors 121 can be used to infer information about connections made using the managed device 104 instead of or in addition to using information read from storage devices 122 attached to cables 108.

Power can be supplied to the active components of the managed device 104 in various ways (for example, by connecting the managed patch panel 104 to the standard AC power grid, using Power-Over-Ethernet technology, or in other ways).

In the exemplary embodiment shown in FIG. 1, the management system 112 is implemented as software that executes on one or more computers 124.

In the exemplary embodiment shown in FIG. 1, each computer 124 comprises one or more programmable processors 126 for executing the software. The software comprises program instructions that are stored (or otherwise embodied) on or in an appropriate non-transitory storage medium or media 128 (such as flash or other non-volatile memory, magnetic disc drives, and/or optical disc drives) from which at least a portion of the program instructions are read by the programmable processor 126 for execution thereby. Although the storage media 128 is shown in FIG. 1 as being included in, and local to, the respective computer 124, it is to be understood that remote storage media (for example, storage media that is accessible over the network 102) and/or removable media can also be used. Each computer 124 also includes memory 130 for storing the program instructions (and any related data) during execution by the programmable processor 126. Memory 130 comprises, in one implementation, any suitable form of random access memory (RAM) now known or later developed, such as dynamic random access memory (DRAM). In other embodiments, other types of memory are used. Each computer 124 also includes one or more network interfaces 132 for communicatively coupling the computer 124 to the network 102.

In the example shown in FIG. 1, the management system 112 further includes an electronic work order application 134. The electronic work application 134 is used to construct electronic work orders 136. Each electronic work order 136 specifies one or more steps that are to be carried out by a technician at a particular location. For example, an electronic work order 136 can indicate that one or more connections implemented using the service ports 116 of the managed device 104 should be added, removed, and/or changed. For steps that involve adding, removing, and/or changing connections made at the service ports 116 of the managed device 104, the information that is read from the associated storage devices 122 and communicated to the management system 112 can be used by the electronic work order application 134 to verify that the specified connection has been added, removed, and/or changed correctly.

As described in more detail below, the visual indicators 118 associated with the service ports 116 of the managed device 104 can be actuated in order to guide a technician in carrying out the steps of electronic work orders 136.

In this example, each electronic work order 136 is communicated to a portable device 138 that is carried by a technician that has been assigned to carry out that electronic work order 136. In this example, the portable device 138 is implemented using smartphone (and is also referred to here as smartphone 138). However, it is to be understood that each portable device 138 can be implemented in other ways (for example, using tablet computers, laptop computers, or similar devices).

In this example, each smartphone 138 is configured to execute a mobile application 140. The mobile application 140 is configured to communicate with the electronic work order application 134 and the management system 112 and to receive the electronic work orders 136. The mobile application 140 comprises program instructions that are stored (or otherwise embodied) on or in an appropriate non-transitory storage medium or media from which at least a portion of the program instructions are read by at least one programmable processor included in the smartphone 138 for execution thereby.

Each electronic work order 136 can be communicated wirelessly to the smartphone 138 over the Internet (for example, via a cellular or wireless local area network to which the smartphone 138 is wirelessly connected). Each electronic work order 136 can also be communicated to the smartphone 138 in other ways (for example, using a wired connection with the smartphone 138).

Figure 2:
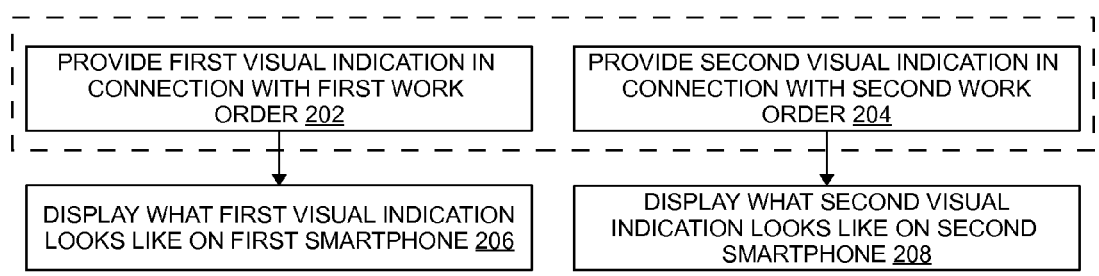
FIG. 2 is a flow diagram of one exemplary embodiment of a method of providing multiple visual indications at a managed device simultaneously in connection with multiple active work orders.

In the exemplary embodiment shown in FIG. 1, the system 100 is configured to support multiple active work orders 136 and multiple technicians working at the device 104 at the same time. The example shown in FIGS. 1 and 2 is described as involving two active work orders 136 and two portable devices 138; however, it is to be understood that this is merely exemplary, and that different numbers of multiple active work orders and portable devices 138 can be used.

The management system 112 and managed device 104 are configured so that multiple visual indications can be provided at the managed device 104 at the same time using the visual indicators 118 in connection with multiple work orders 136.

Each of the multiple visual indications is provided in a different way from the other visual indications that are provided at the same time (for example, by having the associated LED 118 be illuminated using a different color, a different blinking rate, and/or different blinking pattern). Each visual indication is provided in connection with a different work order 136.

A technician that is performing a given work order 136 uses the mobile application 140 executing on a smartphone 138 to help the technician perform the work order 136. The mobile application 140 and the management system 112 are configured so that when a visual indication is provided at the managed device 104, the mobile application 140 displays on the smartphone 138 what that particular visual indication looks like (for example, by displaying on the smartphone 138 an image 141 that shows the color, blink rate, and blink pattern that is used to provide that visual indication). In this way, the technician is able to determine which visual indication is associated with the work order 136 that the technician is performing at that time. As a result, multiple technicians are able to work on multiple active work orders 136 at the same time at a given managed device 104, with multiple visual indications being provided simultaneously at the managed device 104.

FIG. 2 is a flow diagram of one exemplary embodiment of a method 200 of providing multiple visual indications at a managed device simultaneously in connection with multiple active work orders. The exemplary embodiment of method 200 shown in FIG. 2 is described here as being implemented using the system 100 shown in FIG. 1, though it is to be understood that other embodiments can be implemented in other ways. Moreover, the blocks of the flow diagram shown in FIG. 2 have been arranged for ease of explanation; however, it is to be understood that this arrangement is merely exemplary, and it should be recognized that the processing associated with method 200 (and the blocks shown in FIG. 2) can occur in any order (for example, using standard event-driven programming techniques).

Moreover, as noted above the example shown in FIGS. 1 and 2 is described as involving two active work orders 136 and two portable devices 138; however, it is to be understood that this is merely exemplary, and that different numbers of multiple active work orders and portable devices 138 can be used.

Method 200 comprises providing a first visual indication 117 (shown in FIG. 1) at the managed device 104 in connection with a first work order 136 (block 202) and providing a second visual indication 119 (shown in FIG. 1) at the managed device 104 in connection with a second work order (block 204).

The first work order involves a first connection using the managed device 104 (for example, involving a first service port 116 of the managed device 104), and the second work order involves a second connection using the managed device 104 (for example, involving a second service port 116 of the managed device 104).

The first visual indication 117 and the second visual indication 119 are provided simultaneously for at least a part of the time the first visual indication 117 is provided and for at least a part of the time the second visual indication 119 is provided.

Each of the first and second electronic work orders 136, in this example, is communicated to the mobile application 140 executing on the respective smartphone 138 used by the technician that is assigned to perform that electronic work order 136. Each electronic work order 136 can be wirelessly communicated from the electronic work order application 134 to the respective smartphone 138 (for example, using a cellular or wireless local area network communication link) or using a wired connection to the Internet, a local area network, or a direct connection between the smartphone 138 and the computer 124 on which the electronic work order application 134 executes.

After each of the first and second electronic work orders 136 has been downloaded to the mobile application 140 on the respective smartphone 138, the relevant technician can use the mobile application 140 to view the electronic work order 136 and the steps included in the electronic work order 136. After the technicians have travelled to the location where the managed device 104 is installed, the technicians can use the mobile application 140 executing on the smartphones 138 to assist the technicians in carrying out the steps in the work orders 136.

In this example, the management system 112 controls the providing of the first and second visual indications 117 and 119. To provide the first visual indication 117 at the managed device 104, the management system 112 sends a message to the controller 110 in the managed device 104 indicating that the relevant LED 118 in the managed device 104 associated with the relevant step of the first work order (for example, an LED 118 associated with a service port 116 affected by that step) should be illuminated in a particular manner (for example, should be illuminated using a particular color, blink rate, and/or blink pattern). Likewise, to provide the second visual indication 119 at the managed device 104, the management system 112 sends a message to the controller 110 in the managed device 104 indicating that the relevant LED 118 in the managed device 104 associated with the relevant step of the second work order (for example, an LED 118 associated with a service port 116 affected by that step) should be illuminated in a particular manner (for example, should be illuminated using a particular color, blink rate, and/or blink pattern).

In this example, the first visual indication 117 differs from the second visual indication 119.

The method 200 further comprises displaying what the first visual indication 117 looks like on a first portable device 138 configured to display information about the first work order 136 (block 206) and displaying what the second visual indication 119 looks like on a second portable device 138 configured to display information about the second work order 136 (block 208).

As noted above, in this example, the first and second portable devices 138 are implemented using first and second smartphones 138 (though the portable devices 138 can be implemented in other ways).

In this example, the management system 112 is communicatively coupled to the first and second smartphones 138 and is configured to control the displaying of information about the first work order 136 on the first smartphone 138 and the displaying of information about the second work order 136 on the second smartphone 138 by sending appropriate messages to the smartphones 138 (and the mobile applications 140 executing thereon).

In this example, the mobile application 140 executing on the first smartphone 138 displays on the first smartphone 138 what the first visual indication 117 looks like (for example, by displaying on that smartphone 138 an image that shows the color, blink rate, and blink pattern that is used to provide the first visual indication 117). Likewise, in this example, the mobile application 140 executing on the second smartphone 138 displays on the second smartphone 138 what the second visual indication 119 looks like (for example, by displaying on that smartphone 138 an image 142 that shows the color, blink rate, and blink pattern that is used to provide the second visual indication 119). One example how this done is shown in FIG. 1.

In this way, each technician is able to determine which visual indication is associated with the particular work order 136 that the technician is performing at that time. As a result, multiple technicians are able to work on multiple active work orders 136 at the same time at a given managed device 104, with multiple visual indications being provided simultaneously at the managed device 104.

A number of embodiments have been described. Nevertheless, it will be understood that various modifications to the described embodiments may be made without departing from the spirit and scope of the claimed invention.

EXAMPLE EMBODIMENTS

Example 1 includes a system comprising: a device that comprises: a plurality of ports to which cables can be attached; and a plurality of visual indicators, each of which is configured to provide multiple visual indications; wherein the system further comprises a management system communicatively coupled to the device, wherein the management system is configured to control the visual indicators; wherein the management system is configured to cause the device to provide multiple visual indications at the device, each of the multiple visual indications being provided in connection with a respective work order that involves a respective connection using the device; wherein the system is configured to provide the multiple visual indications simultaneously for at least a part of the time each of the multiple visual indications is provided.

Example 2 includes the system of Example 1, further comprising: multiple portables devices, each of the multiple portable devices configured to execute a respective work order application that displays information about a respective work orders; and wherein the system is configured to provide the multiple visual indications simultaneously for at least a part of the time each of the multiple visual indications is provided by doing the following: having the multiple visual indications differ from one another; and for each of the multiple visual indications, in connection with displaying, on a respective one of the multiple portable devices, information about a respective work order, displaying on the respective portable device what the respective visual indication looks like.

Example 3 includes the system of Example 2, wherein the management system is communicatively coupled to the portable devices and is configured to control the displaying of information about the work orders on the portable devices.

Example 4 includes the system of any of the Examples 1-3, wherein the device is configured so that for each of the plurality of ports, when a cable is attached to that port, information is read from any storage device attached to the cable and communicated to the management system for storage thereby.

Example 5 includes the system of any of the Examples 1-4, wherein the management system is configured to monitor the performance of the work orders.

Example 6 includes the system of any of the Examples 1-5, wherein the device comprises at least one of a patch panel, an optical distribution frame, and a splitter tray.

Example 7 includes the system of any of the Examples 1-6, wherein each of the visual indicators comprises a light emitting diode.

Example 8 includes the system of any of the Examples 1-7, wherein the device is configured so that each of the plurality of visual indicators provides the multiple visual indications by doing one or more of: displaying multiple colors; blinking at differing rates; and blinking in multiple patterns.

Example 9 includes the system of any of the Examples 1-8, wherein the device further comprises one or more of: a plurality of contact-based storage device interfaces, each of which is configured for use in reading information from a respective storage device attached to a cable when attached to one of the ports; a plurality of RFID interfaces, each of which is configured for use in reading information from a respective RFID tag attached to a cable when attached to one of the ports; and a plurality of presence sensors, each of which is configured for use in determining if a cable is attached to one of the ports.

Example 10 includes the system of any of the Examples 1-9, wherein the device comprises a controller and a network interface to communicatively couple the controller to the management system.

Example 11 includes a method performed using a device comprising a plurality of ports to which cables can be attached and a plurality of visual indicators, each of which is configured to provide multiple visual indications, the method comprising: providing a first visual indication at the device in connection with a first work order, wherein the first work order involves a first connection using the device; and providing a second visual indication at the device in connection with a second work order, wherein the second work order involves a second connection using the device; wherein the first visual indication and the second visual indication are provided simultaneously for at least a part of the time the first visual indication is provided and for at least a part of the time the second visual indication is provided.

Example 12 includes the method of Example 11, wherein the first visual indication differs from the second visual indication, and wherein the method further comprises: displaying what the first visual indication looks like on a first portable device configured to display information about the first work order; and displaying what the second visual indication looks like on a second portable device configured to display information about the second work order.

Example 13 includes the method of any of the Examples 11-12, wherein a management system is communicatively coupled to the first and second portable devices and is configured to control the displaying of information about the first work order on the first portable device and the displaying of information about the second work order on the second portable device.

Example 14 includes the method of any of the Examples 11-13, further comprising: for each of the plurality of ports, when a cable is attached to that port, reading information from any storage device attached to the cable and communicating the information to a management system for storage thereby.

Example 15 includes the method of any of the Examples 11-14, wherein a management system is communicatively coupled to the device and is configured to monitor the performance of the first and second work orders.

Example 16 includes the method of any of the Examples 11-15, wherein the device is configured so that each of the plurality of visual indicators provides the multiple visual indications by doing one or more of: displaying multiple colors; blinking at differing rates; and blinking in multiple patterns.

Example 17 includes a device comprising: a plurality of ports to attach communication cables to the device; and a plurality of visual indicators, each of the plurality of visual indicators configured to provide multiple visual indications; wherein the device is configured to provide a first visual indication at the device in connection with a first work order, wherein the first work order involves a first connection using the device; wherein the device is configured to provide a second visual indication at the device in connection with a second work order, wherein the second work order involves a second connection using the device; and wherein the first visual indication and the second visual indication are provided simultaneously for at least a part of the time the first visual indication is provided and for at least a part of the time the second visual indication is provided.

Example 18 includes the device of Example 17, wherein the device is configured so that for each of the plurality of ports, when a cable is attached to that port, information is read from any storage device attached to the cable and communicated to a management system for storage thereby.

Example 19 includes the device of any of the Examples 17-18, further comprising: a controller communicatively coupled to the plurality of visual indicators; and a network interface to communicatively couple the controller to a management system.

Example 20 includes the device of any of the Examples 17-19, further comprising one or more of: a plurality of contact-based storage device interfaces, each of which is configured for use in reading information from a respective storage device attached to a cable when attached to one of the ports; a plurality of RFID interfaces, each of which is configured for use in reading information from a respective RFID tag attached to a cable when attached to one of the ports; and a plurality of presence sensors, each of which is configured for use in determining if a cable is attached to one of the ports.

Example 21 includes the device of any of the Examples 17-20, wherein the device comprises at least one of patch panel, an optical distribution frame, and splitter tray.

Example 22 includes the device of any of the Examples 17-21, wherein each of the visual indicators comprises a light emitting diode.

Example 23 includes the device of any of the Examples 17-22, wherein the device is configured so that each of the plurality of visual indicators provides the multiple visual indications by doing one or more of: displaying multiple colors; blinking at differing rates; and blinking in multiple patterns.

Example 24 includes a program product tangibly stored on a non-transitory storage medium comprising instructions operable to cause at least one programmable processor to: communicate with a device to cause the device to provide a first visual indication at the device in connection with a first work order, wherein the device comprises a plurality of ports to which cables can be attached and a plurality of visual indicators, each of which is configured to provide multiple visual indications, and wherein the first work order involves a first connection using the device; and communicate with the device to cause the device to provide a second visual indication at the device in connection with a second work order, wherein the second work order involves a second connection using the device; wherein the first visual indication and the second visual indication are provided simultaneously for at least a part of the time the first visual indication is provided and for at least a part of the time the second visual indication is provided.

Example 25 includes the program product of Example 24, wherein the first visual indication differs from the second visual indication, and wherein the program product comprises instructions operable to cause the programmable processor to: communicate with a first portable device to cause the first portable device to display of what the first visual indication looks like on the first portable device configured to display information about the first work order; and communicate with a second portable device to cause the second portable device to display of what the second visual indication looks like on the second portable device configured to display information about the second work order.

Example 26 includes the program product of any of the Examples 24-25, wherein the device is configured so that each of the plurality of visual indicators provides the multiple visual indications by doing one or more of: displaying multiple colors; blinking at differing rates; and blinking in multiple patterns.

The invention claimed is:

1. A system comprising:
a device that comprises:
a plurality of ports to which cables can be attached; and
a plurality of visual indicators, each of which is configured to provide multiple visual indications;
a management system communicatively coupled to the device, wherein the management system is configured to control the visual indicators;

wherein the management system is configured to cause the device to provide multiple visual indications at the device with the plurality of visual indicators, each of the multiple visual indications being provided in connection with a respective work order that involves a respective connection to a respective port of the plurality of ports;

wherein the system is configured to provide the multiple visual indications simultaneously for at least a part of the time each of the multiple visual indications is provided.

2. The system of claim 1, further comprising:

multiple portable devices, each of the multiple portable devices configured to execute a respective work order application that displays information about a respective work order, wherein the information includes one or more steps that are to be carried out by a technician; and wherein the system is configured to provide the multiple visual indications simultaneously for at least a part of the time each of the multiple visual indications is provided by doing the following:

having the multiple visual indications differ from one another; and for each of the multiple visual indications, in connection with displaying, on a respective one of the multiple portable devices, information about a respective work order, displaying on the respective portable device what the respective visual indication looks like.

3. The system of claim 2, wherein the management system is communicatively coupled to the portable devices and is configured to control the displaying of information about the work orders on the portable devices.

4. The system of claim 1, wherein the device is configured so that for each of the plurality of ports, when a cable is attached to that port, information is read from any storage device attached to the cable and communicated to the management system for storage thereby.

5. The system of claim 1, wherein the management system is configured to verify that a respective connection has been modified correctly.

6. The system of claim 1, wherein the device comprises at least one of a patch panel, an optical distribution frame, and a splitter tray.

7. The system of claim 1, wherein each of the visual indicators comprises a light emitting diode.

8. The system of claim 1, wherein the device is configured so that each of the plurality of visual indicators provides the multiple visual indications by doing one or more of:
displaying multiple colors;
blinking at differing rates; and
blinking in multiple patterns.

9. The system of claim 1, wherein the device further comprises one or more of:
a plurality of contact-based storage device interfaces, each of which is configured for use in reading information from a respective storage device attached to a cable when attached to one of the ports;
a plurality of RFID interfaces, each of which is configured for use in reading information from a respective RFID tag attached to a cable when attached to one of the ports; and
a plurality of presence sensors, each of which is configured for use in determining if a cable is attached to one of the ports.

10. The system of claim 1, wherein the device comprises a controller and a network interface to communicatively couple the controller to the management system.

11. A method performed using a device comprising a plurality of ports to which cables can be attached and a plurality of visual indicators, each of which is configured to provide multiple visual indications, the method comprising:
providing a first visual indication at the device in connection with a first work order, wherein the first work order involves a first connection to a first port of the plurality of ports; and
providing a second visual indication at the device in connection with a second work order, wherein the second work order involves a second connection to a second port of the plurality of ports;
wherein the first visual indication and the second visual indication are provided simultaneously for at least a part of the time the first visual indication is provided and for at least a part of the time the second visual indication is provided.

12. The method of claim 11, wherein the first visual indication differs from the second visual indication, and wherein the method further comprises:
displaying what the first visual indication looks like on a first portable device configured to display information about the first work order; and
displaying what the second visual indication looks like on a second portable device configured to display information about the second work order.

13. The method of claim 11, wherein a management system is communicatively coupled to the first and second portable devices and is configured to control the displaying of information about the first work order on the first portable device and the displaying of information about the second work order on the second portable device.

14. The method of claim 11, further comprising:
for each of the plurality of ports, when a cable is attached to that port, reading information from any storage device attached to the cable and communicating the information to a management system for storage thereby.

15. The method of claim 11, wherein a management system is communicatively coupled to the device and is configured to verify that the first connection and the second connection have been modified correctly.

16. The method of claim 11, wherein the device is configured so that each of the plurality of visual indicators provides the multiple visual indications by doing one or more of:
displaying multiple colors;
blinking at differing rates; and
blinking in multiple patterns.

17. A device comprising:
a plurality of ports to attach communication cables to the device; and
a plurality of visual indicators, each of the plurality of visual indicators configured to provide multiple visual indications;
wherein the device is configured to provide a first visual indication at the device in connection with a first work order, wherein the first work order involves a first connection to a first port of the plurality of ports;
wherein the device is configured to provide a second visual indication at the device in connection with a second work order, wherein the second work order involves a second connection to a second port of the plurality of ports; and
wherein the first visual indication and the second visual indication are provided simultaneously for at least a part of the time the first visual indication is provided and for at least a part of the time the second visual indication is provided.

18. The device of claim 17, wherein the device is configured so that for each of the plurality of ports, when a cable is attached to that port, information is read from any storage device attached to the cable and communicated to a management system for storage thereby.

19. The device of claim 17, further comprising:
   a controller communicatively coupled to the plurality of visual indicators; and
   a network interface to communicatively couple the controller to a management system.

20. The device of claim 17, further comprising one or more of:
   a plurality of contact-based storage device interfaces, each of which is configured for use in reading information from a respective storage device attached to a cable when attached to one of the ports;
   a plurality of RFID interfaces, each of which is configured for use in reading information from a respective RFID tag attached to a cable when attached to one of the ports; and
   a plurality of presence sensors, each of which is configured for use in determining if a cable is attached to one of the ports.

21. The device of claim 17, wherein the device comprises at least one of a patch panel, an optical distribution frame, and a splitter tray.

22. The device of claim 17, wherein each of the visual indicators comprises a light emitting diode.

23. The device of claim 17, wherein the device is configured so that each of the plurality of visual indicators provides the multiple visual indications by doing one or more of:
   displaying multiple colors;
   blinking at differing rates; and
   blinking in multiple patterns.

24. A program product tangibly stored on a non-transitory computer-readable storage medium comprising instructions which, when executed by at least one programmable processor, cause the at least one programmable processor to:
   communicate with a device to cause the device to provide a first visual indication at the device in connection with a first work order, wherein the device comprises a plurality of ports to which cables can be attached and a plurality of visual indicators, each of which is configured to provide multiple visual indications, and wherein the first work order involves a first connection to a first port of the plurality of ports; and
   communicate with the device to cause the device to provide a second visual indication at the device in connection with a second work order, wherein the second work order involves a second connection to a second port of the plurality of ports;
   wherein the first visual indication and the second visual indication are provided simultaneously for at least a part of the time the first visual indication is provided and for at least a part of the time the second visual indication is provided.

25. The program product of claim 24, wherein the first visual indication differs from the second visual indication, and wherein the program product comprises instructions operable to cause the programmable processor to:
   communicate with a first portable device to cause the first portable device to display of what the first visual indication looks like on the first portable device configured to display information about the first work order; and
   communicate with a second portable device to cause the second portable device to display of what the second visual indication looks like on the second portable device configured to display information about the second work order.

26. The program product of claim 24, wherein the device is configured so that each of the plurality of visual indicators provides the multiple visual indications by doing one or more of:
   displaying multiple colors;
   blinking at differing rates; and
   blinking in multiple patterns.

\* \* \* \* \*